J. WHITE.
Faucets.

No. 144,175. Patented Oct. 28, 1873.

WITNESSES.
Eugene F. Cadmus
J. P. Connolly

INVENTOR
Joseph White
By Connolly Bros.
Attorneys.

UNITED STATES PATENT OFFICE.

JOSEPH WHITE, OF PHILADELPHIA, PENNSYLVANIA.

IMPROVEMENT IN FAUCETS.

Specification forming part of Letters Patent No. 144,175, dated October 28, 1873; application filed August 29, 1873.

*To all whom it may concern:*

Be it known that I, JOSEPH WHITE, of Philadelphia, in the county of Philadelphia and State of Pennsylvania, have invented certain new and useful Improvements in Faucets; and I do hereby declare the following to be a full, clear, and exact description of the invention, such as will enable others skilled in the art to which it pertains to make and use it, reference being had to the accompanying drawings which form part of this specification, in which—

Figure 1:
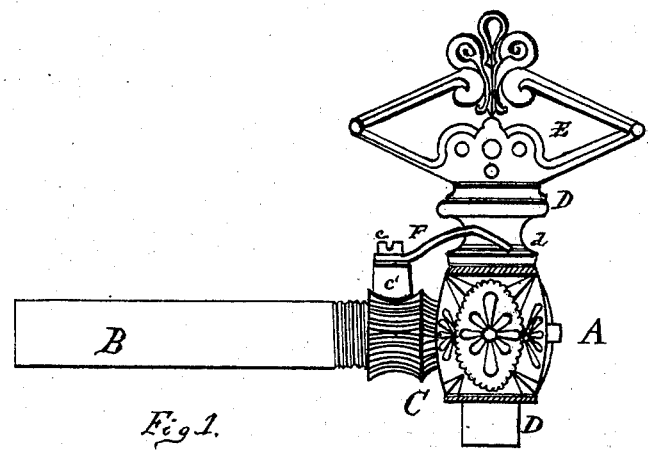
Figure 2:
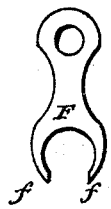

Figure 1 is a side elevation of the faucet complete. Fig. 2 is a plan of the spring disconnected from the faucet.

My invention consists, primarily, in the application to a faucet of a spring, constructed and arranged, substantially as hereinafter fully described, so as to hold the cock firmly in place without lapping, threading, or drilling.

Referring to the accompanying drawing, A shows a faucet, of which B is the stem or pipe that enters the cooler or other vessel to which the device is applied. C is the body, and D the cock having a handle, E. F is a spring for keeping the cock pressed down to its seat. This spring is bifurcated or forked at $ff$ to embrace the cock D, its forked ends fitting in the annular groove $d$. The other end of the spring is fastened securely by means of the screw $c$, which enters the threaded stud $c'$, the design of this stud being to afford a seat for the screw without drilling through the body proper. When the spring is adjusted, as shown, it will bind upon the cock, holding it firmly in place to prevent leakage, and at the same time permitting it to be easily turned to let on or shut off the water-supply.

What I claim as my invention is—

1. The spring F, having a bifurcated end, as shown, in combination with the grooved faucet-plug D and faucet A, substantially as and for the purpose specified.

2. In combination with the faucet having the spring F arranged to press upon the plug D, and the screw $c$ to hold said spring, the threaded stud $c'$ upon the body B, as and for the purpose specified.

In testimony that I claim the foregoing I have hereunto set my hand this 19th day of August, 1873.

JOSEPH WHITE.

Witnesses:
JAMES P. PETIT,
EUGENE P. EADSON.